219-121
6/27/78
SR
OR 4,097,715

United States Patent [19]

Frizzi

[11] 4,097,715

[45] Jun. 27, 1978

[54] LASER JET BELL KILN

[75] Inventor: John N. Frizzi, Pittsburgh, Pa.

[73] Assignee: General Refractories Company, Bala Cynwyd, Pa.

[21] Appl. No.: 797,343

[22] Filed: May 16, 1977

[51] Int. Cl.[2] .................................................. B23K 9/00

[52] U.S. Cl. ............................. 219/121 LM; 266/251; 266/252

[58] Field of Search ....................... 13/2; 266/250, 251, 266/252; 219/121 L, 121 LM

[56] References Cited

U.S. PATENT DOCUMENTS 3,998,441 12/1976 Schuster .............................. 266/252

*Primary Examiner*—J. V. Truhe
*Assistant Examiner*—Fred E. Bell
*Attorney, Agent, or Firm*—Everett H. Murray, Jr.; Brian G. Brunsvold; Joseph R. Slotnik

[57] ABSTRACT

A furnace for firing refractory ware including a vertically movable bell adapted to enclose a car of refractory ware. Means is provided to seal the enclosure defined by the bell, to evacuate air from the sealed bell enclosure, and to deliver a fluidized, chemically inert, non-combustible, high thermal absorption material to the evacuated bell. A plurality of lasers are provided on the bell facing spaced locations therein and are adapted to be fired sequentially. When fired, the light and heat energy from each laser beam is diffused and absorbed by the inert material and is then re-radiated throughout the bell enclosure to fire the refractory ware therein. Also disclosed is a method of firing refractory ware including the steps of positioning a bell having lasers thereon over refractory ware, sealing the enclosure defined by the bell and evacuating air therefrom, injecting a chemically inert, non-combustible, high thermal absorption material into the enclosure, and firing the lasers into the enclosure, heat and light from the laser beams being absorbed by the material and then re-radiated to heat the enclosures and fire the refractory ware.

14 Claims, 4 Drawing Figures

FIG 2
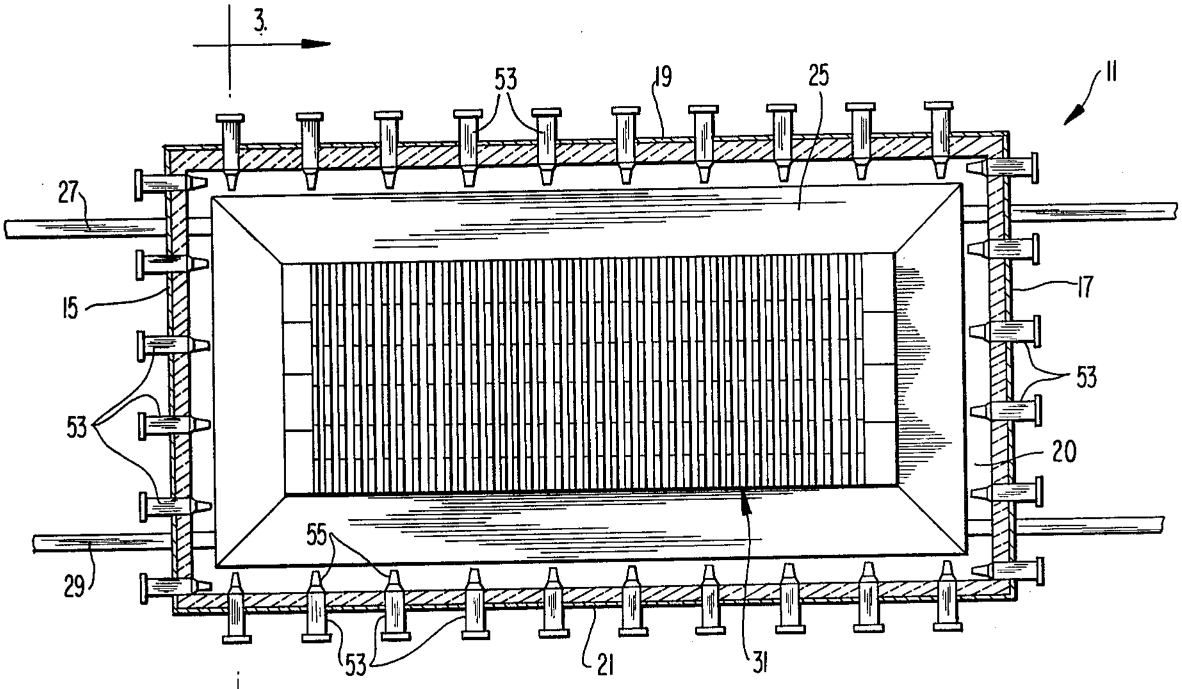
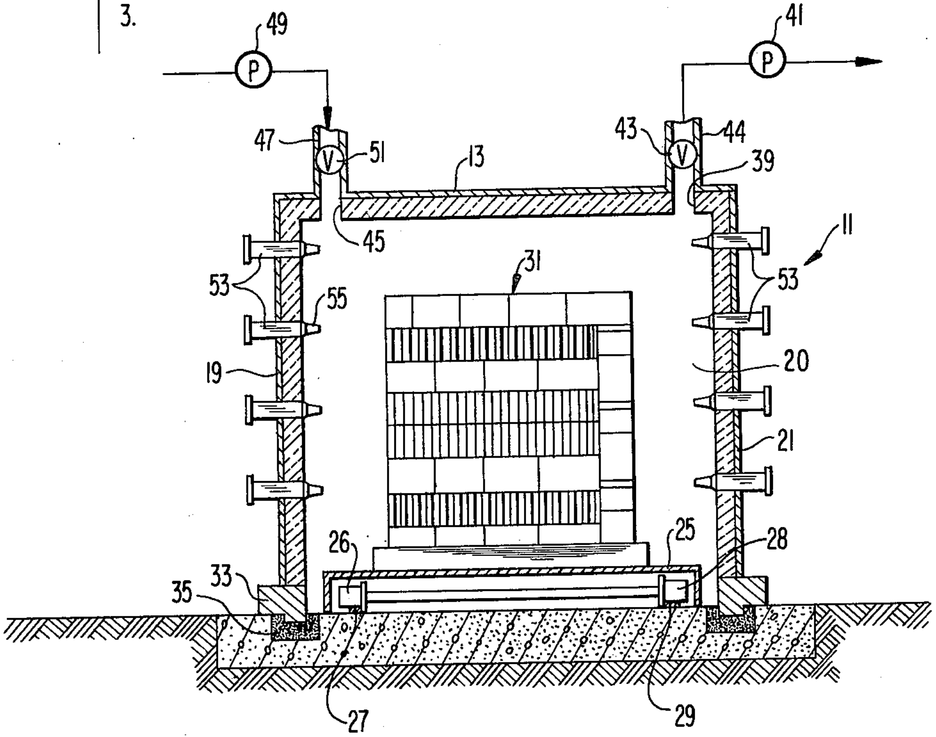
FIG 3

LASER JET BELL KILN

This invention relates to furnaces. More particularly, this invention relates to kilns for firing refractories wherein heat is generated in the kiln by novel means and method.

The means and method of the invention is particularly adapted for firing refractories in a bell kiln. Throughout the specification, numerous references will be made to the heat generating means and method as used in a bell kiln for firing refractories. However, it should be understood that the invention can be used in other furnaces in which heat is generated for other purposes.

Convention kilns used in firing refractories employ an inverted box or bell which can be raised and lowered to enclose refractory ware. Conventionally, these bells carry a plurality of thermostatically controlled, gas fired burners. When the bell is lowered over the refractory ware, the gas burners are turned on to heat the kiln interior and the ware enclosed therein to the necessary temperature. Depending upon the particular refractory material being fired, this temperature may range from about 1800° to about 2800° F.

This firing temperature is maintained in the kiln for up to 12 to 14 hours, after which the kiln and ware are allowed to air cool, and the ware removed. In all, including warm-up, and cool-down, the process requires about 24 hours.

As mentioned above, conventional bell kilns use gas fired burners to generate the necessary heat therein. However, fossil fuels are in short supply, and speculation is that the supply situation on fossil fuels will continue to worsen. Thus, there is a need for a new and improved heat generating means and method which can be used for refractory firing kilns.

Accordingly, it is a primary object of the present invention to provide a new and improved method and means for generating heat in refractory firing kilns.

It is a further object of this invention to provide a new and improved method and means of the above character which does not employ fossil fuels.

A still further object of the invention is to provide a new and improved method and means of the above character which may be easily performed and operated by the same workers knowledgeable in the operation of conventional bell kilns without requiring special retraining.

Another object of the invention is to provide a new and improved method and means of the above character which can be performed and operated substantially in the same environment as conventional bell kilns.

Additional objects and advantages of the invention will be set forth in part in the description which follows, and in part will be obvious from the description, or may be learned by practice of the invention. The objects and advantages of the invention may be realized and attained by means of the instrumentalities, methods and combinations particularly pointed out in the appended claims.

To achieve the foregoing objects and in accordance with the purpose of the invention, as embodied and broadly described herein, the method of this invention comprises the steps of providing a bell defining an enclosure and having a plurality of lasers mounted thereon and facing inwardly thereof, lowering said bell over refractory ware to be fired, sealing said bell enclosure, evacuating air from within said bell enclosure, injecting a fluidized system of a chemically inert, non-combustible, high thermal absorption material into said evacuated bell enclosure, firing said lasers into said bell enclosure, said fluidized material absorbing and diffusing the light and heat energy from said laser beams and re-radiating said absorbed energy to thereby heat the bell enclosure and fire said refractory ware.

In another aspect, the objects and purposes of the invention, as embodied and broadly described herein, are achieved by a kiln for firing refractory ware which comprises a bell defining an enclosure having an open bottom, said bell being movable vertically from a raised position to a lowered position enclosing refractory ware, means for sealing the enclosure defined by said bell when in its lowered position, means for evacuating air from said sealed bell enclosure, means for delivering a fluidized colloid material formed from a chemically inert, non-combustible, high thermal absorption material to said bell enclosure after air has been evacuated therefrom, a plurality of lasers on said bell and constructed to direct laser beams into said bell enclosure at spaced locations therearound, means for firing said lasers, said lasers generating beams of concentrated light and heat energy which is diffused and absorbed by said colloid material and is re-radiated in said enclosure, to thereby heat said bell enclosure and fire said refractory ware.

The accompanying drawings, which are incorporated in and constitute a part of the specification, illustrate one embodiment of the invention and, together with the description, serve to explain the principles of the invention.

OF THE DRAWINGS

FIG. 2 is a horizontal sectional view of a bell kiln constructed essentially in accordance with FIG. 1 and illustrates schematically the air evacuation means and the colloid delivery means;

FIG. 3 is a sectional view of FIG. 2 taken along the lines 3—3 thereof.

Reference will now be made in detail to the present preferred embodiment of the invention, an example of which is illustrated in the accompanying drawings.

Figure 1:
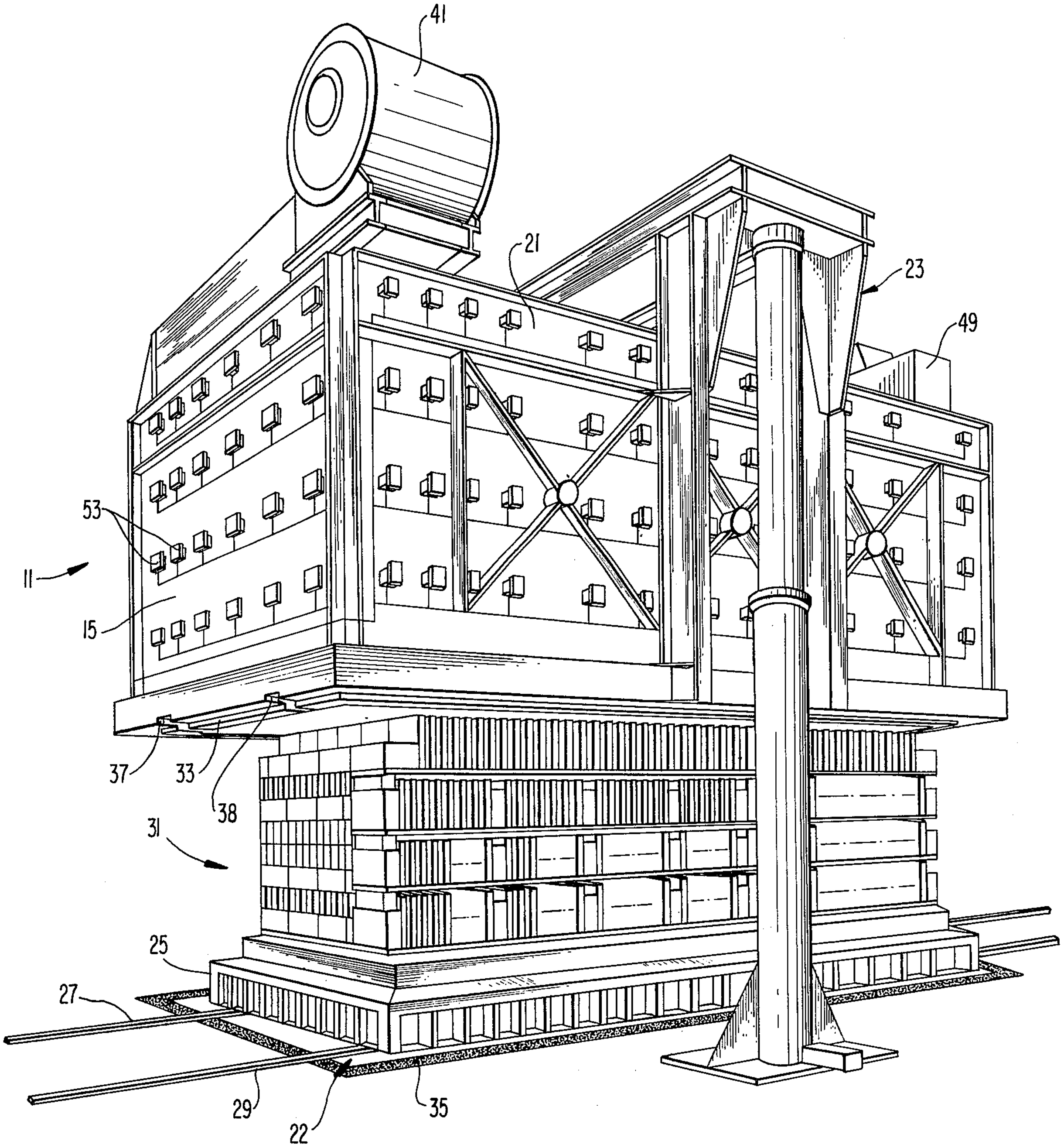
FIG. 1 is a perspective view showing a bell kiln constructed according to, and capable of performing the present invention.

Referring now to FIGS. 1–3, a kiln, embodying the means of the present invention and capable of carrying out the method of the invention, is seen to include an inverted box or bell 11 which has a top 13 and sides 15, 17, 19, 21 defining an enclosure 20 having an open bottom. The bell 11 is located at a kiln station 22 and is movable vertically by suitable means such as a hydraulic elevator 23 from the elevated position shown in FIG. 1, to the lowered position shown in FIG. 3.

Refractory ware illustrated at 31 is adapted to be delivered to the bell kiln station 22 by suitable means such as cars 25 having wheels 26, 28 movable along tracks 27, 29. When the car 25 is moved into the kiln station 22, the bell 11 can be lowered by hydraulic elevator 23 to the position shown in FIG. 3 to enclose the car 25 and ware 31 within enclosure 20.

In accordance with the invention, means is provided to seal the enclosure 20 when the bell 11 is lowered over the refractory ware 31. Thus, the bell 11 is provided with a lower skirt 33 adapted to cooperate with a recessed sand bed 35 when the bell 11 is in its lowered position. The bell skirt 33 is notched at 37, 38 to fit over the tracks 27, 29 when the bell 11 is in its lowered position.

Also in accordance with the invention, means is provided to evacuate air from the bell 11. This means includes an opening 39 in the bell top 13 connected to an evacuation pump 41 by a conduit 44. Thus, when the bell 11 is lowered and the enclosure 20 sealed by engagement of skirt 33 and sand bed 35, operation of the pump 41 evacuates air from enclosure 20. A valve 43 is provided in conduit to close the conduit 44 when the pump 41 is not in operation.

Still further, in accordance with the invention, means is provided to deliver colloid material to the enclosure 20. This means includes an opening 45 in the bell top 13 connected by a conduit 47 to a generator 49. When actuated, the generator 49 is operable to deliver a colloid to the bell enclosure 20. The colloid is a chemically inert, non-combustible, high thermal absorption material and is made up of solid particles, fly ash, carbon black, or similar material, suspended in an inert gas and forming a fluidized system. Preferably, the solid particles in the colloid are micron or submicron in size. A valve 51 is operable to close conduit 47 when pump 41 is not in operation.

In accordance with the invention, the bell is provided with a plurality of lasers 53 positioned at spaced locations therearound. Lasers 53 are mounted on the bell 11 and extend through its sides 15, 17, 19, 21, and each laser has a tip 55 facing inwardly of the enclosure 20. The lasers 53 can be conventional solid-state type lasers, e.g., ruby or sapphire, or they can be gas-types using, for example, $CO_2$ as a medium. In general, the gas-type ($CO_2$) lasers operate at higher wavelengths than the solid-state (ruby) lasers. Since most ceramics, such as refractory ware, tend to absorb energy more efficiently at higher wavelengths, gas lasers might be preferred in some installations.

However, gas lasers typically are available in higher power ranges, on the order of 1000 watts, and are somewhat more expensive than solid-state lasers which are normally available in the range of 100 watts or less. Thus, in installations having lower power requirements, solid-state lasers may be preferred.

However, the construction of the lasers 53, per se, forms no part of the invention, and it is sufficient to understand that each laser 53 generates a parallel and highly coherent beam of light which emerges from tip 55 at the end of each laser 53, and that these light beams are directed into the enclosure 20.

The beams from lasers 53 are concentrated forms of light and heat energy and when directed into the enclosure 20, impinge upon the fluidized colloid suspended therein. The high concentration of micron or submicron particles in the colloid causes the laser beams to diffuse and the high opacity of the colloid (preferably about 95% or greater) allows it to absorb most of the light-heat energy from the laser beams.

Thus, the colloid particles (black fly-ash, carbon black, or similar materials) absorb as a black box radiator during the firing of the lasers. Because of the small size of these colloid particles, they stay suspended and re-radiate the light-heat energy in a substantially more uniform fashion after laser firing has ceased.

The lasers 53 dispersed around the bell 11 can be fired in a controlled sequence, as will be understood and appreciated by those skilled in this art, so that the heat energy re-radiated in the bell enclosure 22 can be highly uniform. Thus, a first laser 53 can fire at the time a second laser is fully charged; the second can fire when a third is fully charged; and so on until the last laser is fired and the first is fully charged, and the cycle repeats.

Furthermore, the temperature in the bell enclosure is a function of the capacity of the lasers 53, and the rate at which those lasers are fired, and can be closely controlled by governing that rate of firing. This temperature can be maintained by, for example, conventional thermostatic controls currently used in gas-fired kilns.

In use, a kiln car 25 having refractory ware 31 disposed thereon is moved into kiln station 22 while the bell 11 is in its raised position substantially as shown in FIG. 1. The bell 11 is then lowered, by means of the elevator 23, over the ware 31 and the sealing means 33, 35 engaged to seal the enclosure 22.

With valve 43 open and valve 51 closed, pump 41 is operated to evacuate air within bell enclosure 20 to, for example, about minus three atmospheres. Valve 43 is then closed and valve 51 opened, and generator 49 turned on to inject colloid material into the enclosure 20. When sufficient colloid material has been delivered to the bell enclosure 20 to develop a pressure therein equal to about atmosphere pressure or greater, generator 49 is turned off and valve 51 is closed. The lasers 53 then are actuated, preferably sequentially, and fired at the desired rate to raise the temperature in the enclosure 20 to the appropriate temperature to fire the ware 31. This temperature is maintained for the necessary time, again by controlling the rate at which lasers 53 are fired, and then the refractory ware 31 is allowed to cool.

Figure 4:
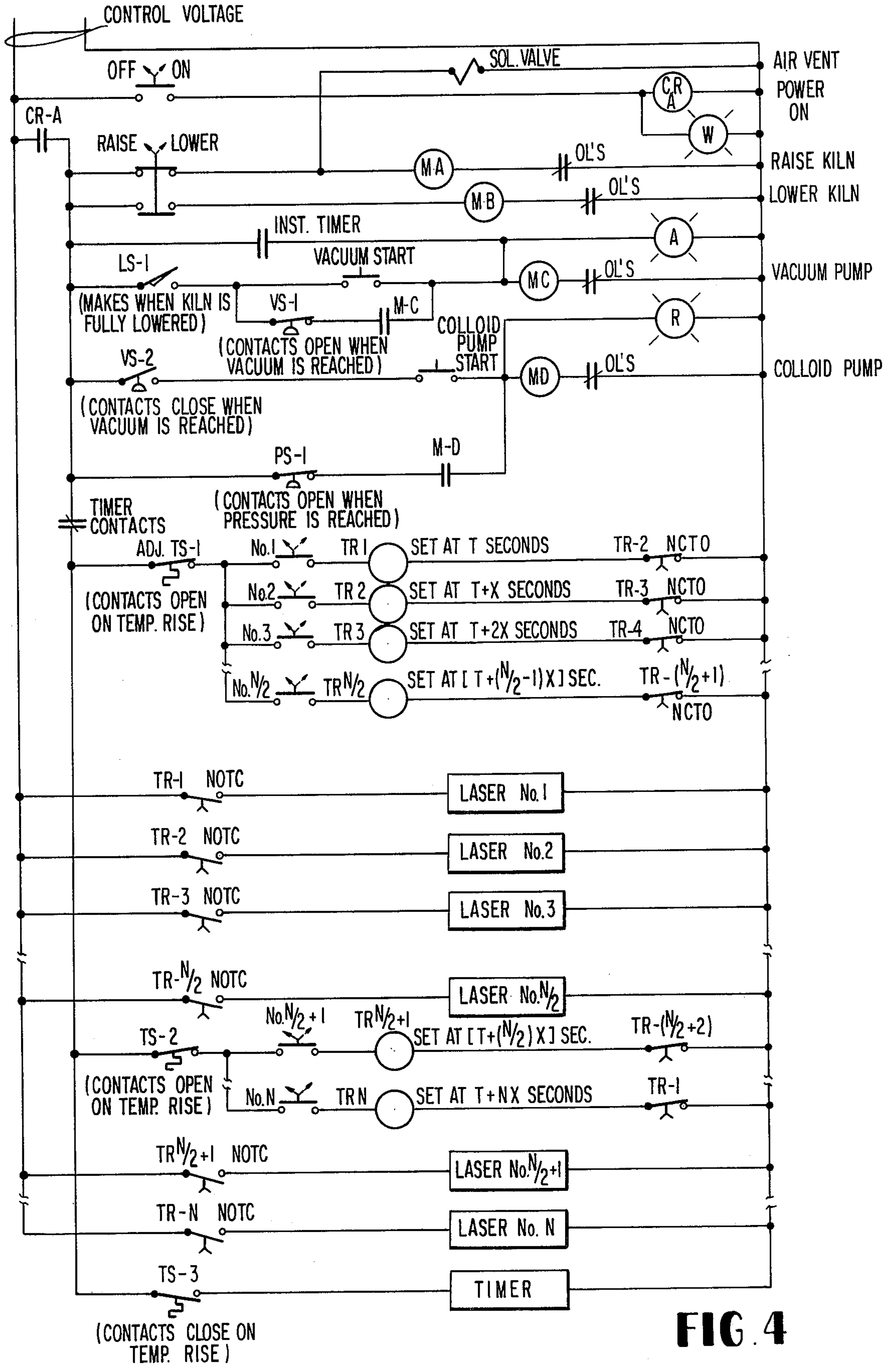
FIG. 4 is a schematic illustration showing a control system for the invention.

Reference is now made to FIG. 4 which illustrates a circuit capable of controlling movement of the bell 11 and sequential laser firing. When car 25 with refractory ware 31 is in place at station 22, the on/off switch is turned "on" energizing control relay CRA which closes normally open contacts CR-A. The "raise-lower" switch is moved to the "lower" position shown, energizing motor starter MB, and causes the bell 11 to move downwardly. Light W is lit indicating that power is "on" and that the bell 11 is in the process of lowering.

When the bell 11 is fully lowered, limit switch LS-1 closes. The operator then can close a push-button, vacuum switch which actuates a starter MC for the vacuum pump 41. Contacts M-C close when the push button for the vacuum start is actuated and continue operation of the vacuum pump after the push-button switch is released.

When the desired vacuum level is reached in the bell enclosure 20, contacts VS-1 open terminating operation of the vacuum pump 41. At the same time, contacts VS-2 are closed.

At this point the operator closes the push-button colloid pump start switch. This energizes the pump starter MD and the colloid pump 49 begins to deliver the fluidized colloid material to the bell kiln enclosure 20. Contacts M-D close when the push-button colloid pump start switch is closed and continue operation of the colloid pump 49 after the push-button switch is released. Light R is lit when the pump 49 is operating.

When sufficient colloid material is pumped into the bell 11, pressure in enclosure 20 causes contacts PS-1 open and colloid pump 49 ceases operation.

Suitable overload switches OL's are provided in the "raise kiln", "lower kiln", "vacuum pump", and "colloid pump" circuits.

The operator selects the number of lasers 53 that he wishes to operate by closing the appropriate laser selector switches Nos. 1-N. Assuming that all the illustrated selector switches are closed, the sequence of operation for the lasers is as follows:

Timing relay TR1 is set to operate at *T* seconds at which time the contacts TR-1 NOTC (normally open, timed to close) close and fire laser No. 1. Contacts TR-2 NCTO (normally closed, timed to open), in series with timing relay TR1, remain closed throughout firing of laser No. 1.

Timing relay TR2 is set to operate at T+X seconds so that upon lapse of T+X seconds, contacts TR-2 NCTO close and fire laser No. 2. When timing relay TR2 times out, contacts TR-2 NCTO open resetting timing relay TR1 so that it again begins to cycle.

Meanwhile, timing relay TR3 operates at T+2X seconds at which time contacts TR-3 NOTC close and fire laser No. 3. At this point, contacts TR-3 NCTO open and reset timing relay TR2.

This continues until timing relay TR N/2 operates and fires laser No. N/2. Following this, the cycle begins over with the firing of laser No. 1 as described above. It will be appreciated that appropriate values for T and X can be selected to achieve even spacing of the firing of the various lasers.

This cycle continues until a preselected temperature in bell enclosure 22 is reached, at which point temperature switch TS-1 opens. If thereafter the temperature in enclosure 22 drops below this setting, TS-1 again closes and begins the above described laser firing cycle over again.

In addition to the bank of lasers controlled by TS-1 it is preferable that at least one additional bank of independently operating lasers be provided. This second bank of lasers functions in the same manner as the above described bank, but the lasers of the second bank are controlled by an independent temperature switch TS-2. The control temperature for TS-2 can be set differently, that is, higher than the temperature setting for TS-1. In this manner, the temperature in enclosure 20 can be rapidly raised to a first level (by simultaneously firing both banks of lasers), and then can be raised at a slower rate to the ultimate refractory ware firing temperature by firing only the bank of lasers controlled by TS-2).

A normally open temperature switch TS-3 is closed when the temperature in enclosure 20 reaches the preselected level necessary to fire the refractory ware therein, preferably at the same temperature at which TS-2 opens. When this occurs, a timer in series with TS-3 is actuated and allows the second bank of lasers to continue firing as necessary and controlled by closing of switch TS-2, to maintain the desired temperature in enclosure 20. Upon lapse of the time period set for TIMER, INST. TIMER contacts close and energize the vacuum pump 40 to begin evacuation of the bell enclosure 20.

When the bell enclosure 20 is fully evacuated, amber light "A" goes out. The raise and lower switch is then moved to the "raise" position and energizes motor starter MA causing the bell 11 to raise. At the same time, SOL. VALVE in the air vent line is actuated causing the bell 11 to be vented to atmosphere.

Importantly, the rate of laser firing is selected to heat the bell enclosure 22 at substantially the same rate as is attained in standard gas-fired kilns, since this rate is important in achieving the desired results in the refractory firing process.

Similarly, the time for, and the burn temperature maintained in, the kiln during the firing process, and the time required for cool down of the kiln after the firing process, should also follow closely that of the standard gas-fired units.

Typically, the time and temperature ranges for refractory firing can be illustrated as follows:

| Step | Time | Temperature |
|---|---|---|
| Heat up | 6 to 8 hours | To 1800° - 2800° F |
| Burn (firing) | 10 to 12 hours | 1800° - 2800° F |
| Cool down | 6 to 8 hours | To ambient temperature |

In accordance with the present invention, a bell kiln having 32, solid-state, ruby type lasers 53, each having an input of about 85 to 100 watts, can fire a 1200 pound refractory ware charge within the time and temperature parameters given above. These lasers are capable of being charged in a few milliseconds, and can be sequentially fired at a rate of about one per second.

The invention provides a new and novel method and means for firing refractory ware which obviates the need for fossil fuels. It will be apparent to those skilled in the art that various additions, substitutions, modifications, variations, and omissions may be made thereto without departing from the scope or spirit of the invention.

What is claimed is:

1. A method of firing refractory ware which comprises the steps of providing a bell defining an enclosure and having a plurality of lasers mounted thereon and facing inwardly thereof, lowering said bell over refractory ware to be fired, sealing said bell enclosure, evacuating air from within said bell enclosure, injecting a fluidized system of a chemically inert, non-combustible, high thermal absorption material into said evacuated bell enclosure, firing said lasers into said bell enclosure, said fluidized material absorbing and diffusing the light and heat energy from said laser beams and re-radiating said absorbed energy to thereby heat the bell enclosure and fire said refractory ware.

2. A method as defined in claim 1 wherein the step of evacuating air from said bell enclosure reduces the pressure therein to about minus three atmospheres.

3. A method as defined in claim 2 wherein the step of injecting said fluidized system raises the pressure in said bell enclosure to about atmospheric pressure.

4. A method as defined in claim 1 wherein at least some of said lasers are fired sequentially to distribute the light and heat energy throughout said bell enclosure.

5. A method as defined in claim 1 wherein the temperature in said bell enclosure is raised to from about 1800° F to about 2800° F in a period of about 6 to 8 hours, and is held for a period of about 10 to 12 hours.

6. A method as defined in claim 1 wherein said fluidized system includes micron and sub-micron particles having an opacity of at least about 95% and suspended in an inert gas.

7. A method as defined in claim 1 wherein said lasers include at least two banks of lasers, the firing of said lasers including the steps of firing both banks of lasers to rapidly raise the temperature in said enclosure to a first predetermined level, and then firing only one bank of lasers to raise said temperature to a second predetermined level higher than said first level.

8. A method as defined in claim 1 wherein said fluidized material is made up of at least one material from the group of black fly-ash and carbon black particles suspended in an inert gas.

9. A method as defined in claim 1 wherein the step of evacuating air from said bell enclosure lowers the pressure therein to about minus three atmospheres.

10. A method as defined in claim 9 wherein injection of the fluidized material into said enclosure raises the pressure therein to about atmospheric pressure.

11. A kiln for firing refractory ware, which comprises a bell defining an enclosure having an open bottom, said bell being movable vertically from a raised position to a lowered position enclosing refractory ware, means for sealing the enclosure defined by said bell when in its lowered position, means for evacuating air from said sealed bell enclosure, means for delivering a fluidized colloid including a chemically inert, non-combustible, high thermal absorption material to said bell enclosure after air has been evacuated therefrom, a plurality of lasers on said bell and constructed to direct laser beams into said enclosure defined by said bell at spaced location therearound, means for firing said lasers, said lasers generating concentrated light and heat energy which is diffused and absorbed by said colloid material and is re-radiated to thereby heat said bell enclosure and fire said refractory ware.

12. A kiln as defined in claim 11 wherein the means for firing said lasers includes means causing sequential firing of at least some of said lasers.

13. A kiln as defined in claim 11 wherein said lasers include at least two separate banks of lasers, said laser firing means including means for independently controlling firing of said banks of lasers.

14. A kiln as defined in claim 8 wherein said lasers include solid-state, ruby type lasers each having an input of about 85 to 100 watts.

* * * * *